May 29, 1962     G. A. GAYLER     3,037,148
IGNITION SYSTEMS FOR INTERNAL COMBUSTION ENGINES
Filed Dec. 28, 1959
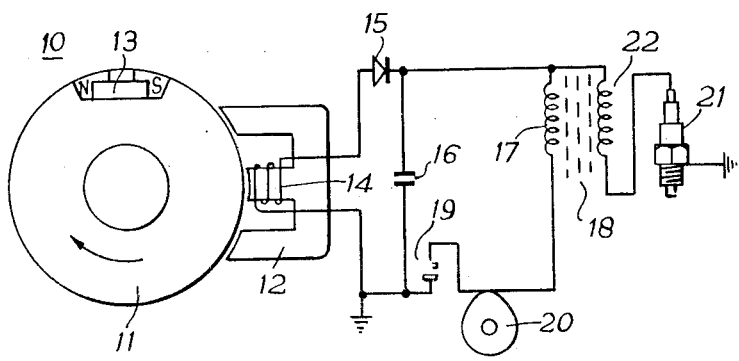
INVENTOR
GEORGE ALFRED GAYLER
BY
Craig & Freudenberg
ATTORNEYS

United States Patent Office 3,037,148
Patented May 29, 1962

3,037,148
IGNITION SYSTEMS FOR INTERNAL
COMBUSTION ENGINES
George Alfred Gayler, Bletchley, England, assignor to
Wipac Development Limited, London, England, a British company
Filed Dec. 28, 1959, Ser. No. 862,210
Claims priority, application Great Britain Jan. 8, 1959
8 Claims. (Cl. 315—206)

It has been proposed hitherto to provide an ignition system of the type comprising a capacitor, make-and-break contacts and the primary winding of a voltage step-up transformer connected in series, a sparking plug being connected across the secondary winding of the transformer, and means being provided for charging the capacitor.

In operation the capacitor is charged with the make-and-break contacts open. When the contacts close the capacitor discharges through the primary winding of the transformer inducing a high voltage in the secondary winding and causing a discharge across the discharge gap of the sparking plug.

In designing such an ignition system it is of considerable importance to provide a source of current for charging the capacitor, the voltage of which is adequate at low speeds for starting but does not become unduly high at normal and maximum running speeds.

The present invention is concerned with ignition systems of the type specified in which the means for charging the capacitor comprise an alternator connected through a rectifier to the capacitor, the alternator having a rotor with a permanent magnet co-operating with a stator, the stator having an output winding connected through the said rectifier to the capacitor.

It is usual to find in such alternators that the output voltage increases substantially linearly with speed and hence if the construction is such that the output voltage is adequate for starting purposes it becomes unduly large at higher engine speeds.

For most ignition purposes an output of about 300 volts at maximum engine speeds is desirable otherwise insulation difficulties arise and more costly capacitors and rectifiers have to be used whereby the cost of the ignition system can become too great to compete with conventional ignition systems using induction coil ignition.

According to the present invention an ignition system for an internal combustion engine comprises a capacitor, make-and-break contacts and the primary winding of a voltage step-up transformer connected in series, a sparking plug connected across the secondary winding of the transformer and an alternator connected through a rectifier to the capacitor, the alternator having a rotor with a permanent magnet co-operating with a stator provided with an output winding of a plurality of turns of high-resistance wire, and the output winding being of high impedance relative to the load imposed on the alternator by the ignition system at normal running speeds.

For the purpose of this specification, high resistance wire is composed of a material having a specific resistance of not less than 1.2 micro-ohms per cubic inch at 20° C.

The invention will now be described, by way of example, with reference to the accompanying drawing which is a schematic drawing of an ignition system for a single-cylinder internal combustion engine.

In the drawing an alternator 10 comprises a rotor 11 and a stator 12. The rotor 11 carries a permanent magnet 13 which, on rotation past the stator 12 induces an E.M.F. in a winding 14.

The winding 14 is connected through a rectifier 15 to charge a capacitor 16 of 0.2 microfarad capacitance.

Across the capacitor 16 the primary winding 17 of a voltage step-up transformer 18 and make-and-break contacts 19 are connected in series. The contacts 19 are operated by the usual cam 20. A sparking plug 21 is connected across the secondary winding 22 of the transformer 18. The transformer 18 has a turns ratio of 70:1 and an inductance of 20 microhenries measured across the primary winding.

The winding 14 has 5000 turns of 36 S.W.G. (standard wire gage) aluminium wire and tests have shown a steep rise in output voltage up to 250 volts at 2000 r.p.m. followed by a progressively reducing rate of increase to 225 volts at 3000 r.p.m. On replacing the winding with a winding of 4000 turns of 34 S.W.G. copper wire the voltage increased from 250 volts at 2000 r.p.m. to 325 volts at 3000 r.p.m.

Although an embodiment has been described using aluminium wire for the winding it will be appreciated that wire of other metals may be used for example brass, iron, and high-resistance copper may be used.

Although the transformer 18 is shown as an auto-transformer, it can alternatively have separate primary and secondary windings.

I claim:
1. An ignition system for an internal combustion engine comprising a capacitor, make-and-break contacts and the primary winding of a voltage step-up transformer connected in series, a sparking plug connected across the secondary winding of the transformer and means including an alternator connected through a rectifier to charge the capacitor, the alternator having a rotor with a permanent magnet co-operating with a stator provided with an output winding of a plurality of turns of high-resistance wire, and the output winding being of high impedance relative to the load imposed on the alternator by the ignition system at normal running speeds.

2. An ignition system according to claim 1, wherein the high-resistance wire is of aluminium.

3. An ignition system for an internal combustion engine comprising a permanent magnet alternator driven by said engine and having an output circuit means including an output winding of a plurality of turns of high-resistance wire, a capacitor, means including a rectifier connecting said output circuit means to charge the capacitor from said output winding, discharge circuit means connected to said capacitor and including make-and-break contact means actuated by said engine and a voltage step-up transformer having its priimary connected in series with said contact means across said capacitor, said output winding being of high impedance relative to the load imposed on the alternator by the ignition system at normal running speeds of said engine.

4. An ignition system according to claim 3, wherein said high-resistance wire is of a material having a specific resistance of at least 1.2 micro-ohms per cubic inch at 20° C.

5. An ignition system according to claim 3, wherein said high-resistance wire is brass.

6. An ignition system according to claim 3, wherein said high-resistance wire is iron.

7. An ignition system according to claim 3, wherein said high-resistance wire is a high-resistance copper having a specific resistance of at least 1.2 micro-ohms per cubic inch at 20° C.

8. An ignition system according to claim 3, wherein said alternator has an output voltage of the order of 300 volts at maximum engine speed.

References Cited in the file of this patent

UNITED STATES PATENTS

| | | |
|---|---|---|
| 2,377,793 | Linlor | June 20, 1945 |
| 2,440,154 | Oles | Apr. 20, 1948 |
| 2,443,060 | Wall | June 8, 1948 |
| 2,456,475 | Wargin | Dec. 14, 1948 |
| 2,543,371 | McNulty | Feb. 27, 1951 |
| 2,863,099 | Smits | Dec. 2, 1958 |